United States Patent [19]  [11] 4,058,680
Curtis [45] Nov. 15, 1977

[54] TELEPHONE MESSAGE TIMING SYSTEM

[75] Inventor: Robert Bartlett Curtis, Columbus, Ohio

[73] Assignee: Bell Telephone Laboratories, Incorporated, Murray Hill, N.J.

[21] Appl. No.: 747,509

[22] Filed: Dec. 6, 1976

[51] Int. Cl.² .......................................... H04M 15/18
[52] U.S. Cl. ................................................. 179/7.1 R
[58] Field of Search ............... 179/7 R, 7 MM, 7.1 R, 179/7.1 TP, 8 R, 8 A, 2 TC, 1 MN, 175.2 R

[56] References Cited

U.S. PATENT DOCUMENTS

| 3,551,599 | 12/1970 | White | 179/7.1 R |
| 3,573,378 | 4/1971 | Leyburn et al. | 179/7.1 R |
| 3,739,097 | 6/1973 | Leyburn et al. | 179/7.1 R |
| 3,806,652 | 4/1974 | Woolf et al. | 179/7.1 R |
| 3,812,293 | 5/1974 | Padgett | 179/7.1 TP |
| 3,813,495 | 5/1974 | Cowerly | 179/7 R |
| 3,828,135 | 8/1974 | Padgett | 179/7 R |
| 3,934,090 | 1/1976 | Curtis et al. | 179/7.1 R |
| 3,982,073 | 9/1976 | Baltzer et al. | 179/7.1 R |

Primary Examiner—William C. Cooper
Assistant Examiner—Gerald L. Brigance
Attorney, Agent, or Firm—William H. Kamstra

[57] ABSTRACT

A timing arrangement for use with a telephone switching system having automatic message accounting equipment at a recording center to adjust apparent call duration times to compensate for delays caused by the temporary storage of call data at remote telephone offices. Cycling, counting apparatus is provided at each of the remote telephone offices to generate sequential time interval data representative of successive time intervals. Logic apparatus combines the time interval data with telephone office trunk random answer and disconnect event data to form a plurality of first data words in a buffer store. Transmitting apparatus responds to command of the recording center by transmitting a block of first data words from the buffer store followed by a final data word identifying the current time interval data to the recording center. At the recording center, a comparison of the time interval data in each received first data word with the final data word generates delay times utilized for adjusting the apparent time of day of the answer and disconnect events to compensate for delays encountered in transmitting the event data.

12 Claims, 2 Drawing Figures

TELEPHONE MESSAGE TIMING SYSTEM

BACKGROUND OF THE INVENTION

This invention relates to telecommunication switching systems and more particularly to apparatus for timing, commonly for billing purposes, of calls originated by stations served by such systems.

Telephone switching systems which control the interconnection of calling stations with called stations are usually provided with automatic message accounting equipment for assessing message charges against a calling station for billing purposes. When a call to a called subscriber originates at a called subscriber station, the switching system serving the calling station accesses message accounting equipment to record an initial entry identifying the calling station, the called station, and the switching system trunk equipment employed to establish a call connection. After the call connection has been established, the switching system trunk equipment detects the answer of the call by the called telephone station and again accesses the automatic message accounting equipment in order to record an answer entry which fixes the time the call was answered. Subsequently, the switching system trunk equipment detects the disconnect of the calling and called stations from the call connection and again accesses the automatic message accounting equipment in order that a disconnect entry fixing the disconnect time of the call connection may be recorded. Three entries are thus recorded for each telephone call by this type of automatic message accounting equipment: initial, answer, and disconnect.

The trunk equipment of a telephone switching system typically comprises a number of trunks arranged to connect the switching system with other switching systems to establish call connections between calling and called subscriber stations. Typically, the trunks are selectively connectable to a recorder which accesses an associated perforator to record the initial, answer, and disconnect entries as perforations on paper tape. The paper tapes thus produced by the perforators at various geographically dispersed central offices are transported to a centralized data processing center where the billing charges are computed. In a more recent telephone system, billing data is assembled directly from a central office recorder and transmitted via a data link to a distant automatic message accounting recording center (AMARC) where the billing data is recorded on magnetic tape. This billing data transmission arrangement advantageously overcomes problems such as the physical bulk and low information storage density, for example, encountered with the use of paper tape.

A billing data transmitter of the character contemplated is physically located at a central office, as mentioned, remote from the AMARC and is arranged to connect with central office recorder equipment. When an automatic message accounting trunk detects a call answer or disconnect, the recorder equipment registers the identity of the trunk and requests the services of the billing data transmitter (BDT). The latter records the trunk identity data togetherwith data representing the fact of an answer or disconnect. This data is stored in a BDT buffer memory to wait transmission to the distant AMARC. Since the rate of storing data in the buffer may occasionally exceed the transmission rate, a varying transmission delay is introduced between a BDT and the service AMARC. As a result, the times of receipt of call answer and disconnect data at the AMARC cannot be relied on as actual times of occurrence without some means for determining the transmission delay introduced. Since a calling subscriber is billed for the call period between answer and disconnect, high precision in recording the initiation and termination of a call is required to avoid errors in call charging. One solution to the timing problem is to provide a highly accurate clock at each BDT location to note the actual times of the answer and disconnect occurrences. Data representing these times may then be relayed to the AMARC for recording. A mechanism would be needed for setting each BDT clock and possibly also a mechanism for synchronizing each with the AMARC clock. Obviously, such a timing arrangement is both complex and costly.

An object of this invention is the precise timing of telephone call answer and disconnect occurrences in an automatic message accounting system in which variable data transmission delays may be encountered.

Another object of this invention is the provision of apparatus for accurately timing telephone call information at a central recording center, which information originates at a plurality of remotely located offices and is subject to variable transmission delays.

A further and more general object of this invention is the provision of apparatus for centrally recording the precise time of occurrence of events at a plurality of remote locations when the transmission of information regarding the events is subject to unpredictable delays.

It is also an object of this invention to simplify and reduce the cost of telephone system apparatus for accurately determining delays in the transmission to a recording center of data relating to call answer and disconnect occurrences at a remote central office.

SUMMARY OF THE INVENTION

The foregoing and other objects of this invention are realized in one illustrative embodiment thereof adapted for operation in conjunction with a billing data transmitter (BDT) designed to replace the prior art tape perforator equipment of a telephone central office switching system. The billing data transmitter is arranged for connection to the automatic message accounting (AMA) recorder of the central office. When an AMA trunk detects an answer or disconnect occurrence of a telephone call, the AMA recorder registers the identity of the trunk and requests the services of the BDT. The latter equipment records the trunk identity and adds entry time interval data to answer and disconnect data as it is received. These combined data are temporarily stored in a buffer memory of the BDT where the data is held until a distant automatic message accounting recording center (AMAR) polls the BDT via a data link responsive to which the stored answer and disconnect entries together with the associted time interval data are transmitted to the AMARC. Data representative of the termination of the transmission sequence is also relayed to the AMARC as a final time interval entry. At the latter center the precise time of occurrence of each answer and disconnect is determined by subtracting the difference between the entry time interval and the final end of transmission time interval from the time of day as determined at the AMARC.

According to one feature of the invention, the precise timing of a call answer and disconnect occurrence is accomplished at a remote central office BDT by providing thereat a low precision time interval clock for generating a continuous train of timing pulses at intervals, for the embodiment being described, of 0.1 seconds. These pulses are counted by a time interval cycling counter which generates binary coded data indicative of a particular count. Each time call data representative of an answer or disconnect occurrence is received from an AMA office recorder, logic circuitry is provided for combining the call data with the timing data generated by the interval counter. These combined data are then stored in the BDT memory until called for by the AMARC as previously indicated. After the prescribed amount of data from the BDT memory has been transmitted to the AMARC, final time interval count data is taken from the BDT time interval counter and transmitted to the AMARC. The arithmetic operations mentioned previously are there performed to determine the BDT storage delay and the actual time-of-day occurrences of the answers and disconnects with reference to the AMARC master clock.

Advantageously, the determination of the precise time of occurrence of call answer and disconnect events, as accomplished by the illustrative apparatus of this invention as summarized in the foregoing, eliminates the necessity of determining the actual time-of-day occurrence of those events at remote BDT stations. The determination of the relation of corresponding call answer and disconnect events among various BDT stations is also facilitated when the need for comparing actual times of day of those events is eliminated. It will be appreciated that although the apparatus according to this invention was summarized in the foregoing in the context of timing telephone call answer and disconnect occurrences, the invention is broadly applicable to the timing of the occurrence of other distant events and the recordation of that timing at a central recording point.

BRIEF DESCRIPTION OF THE DRAWING

The foregoing and other objects and features of this invention will be better understood from a consideration of the detailed description of the organization and operation of an illustrative embodiment thereof which follows when taken in conjunction with the accompanying drawing in which.

DETAILED DESCRIPTION

Figure 1:
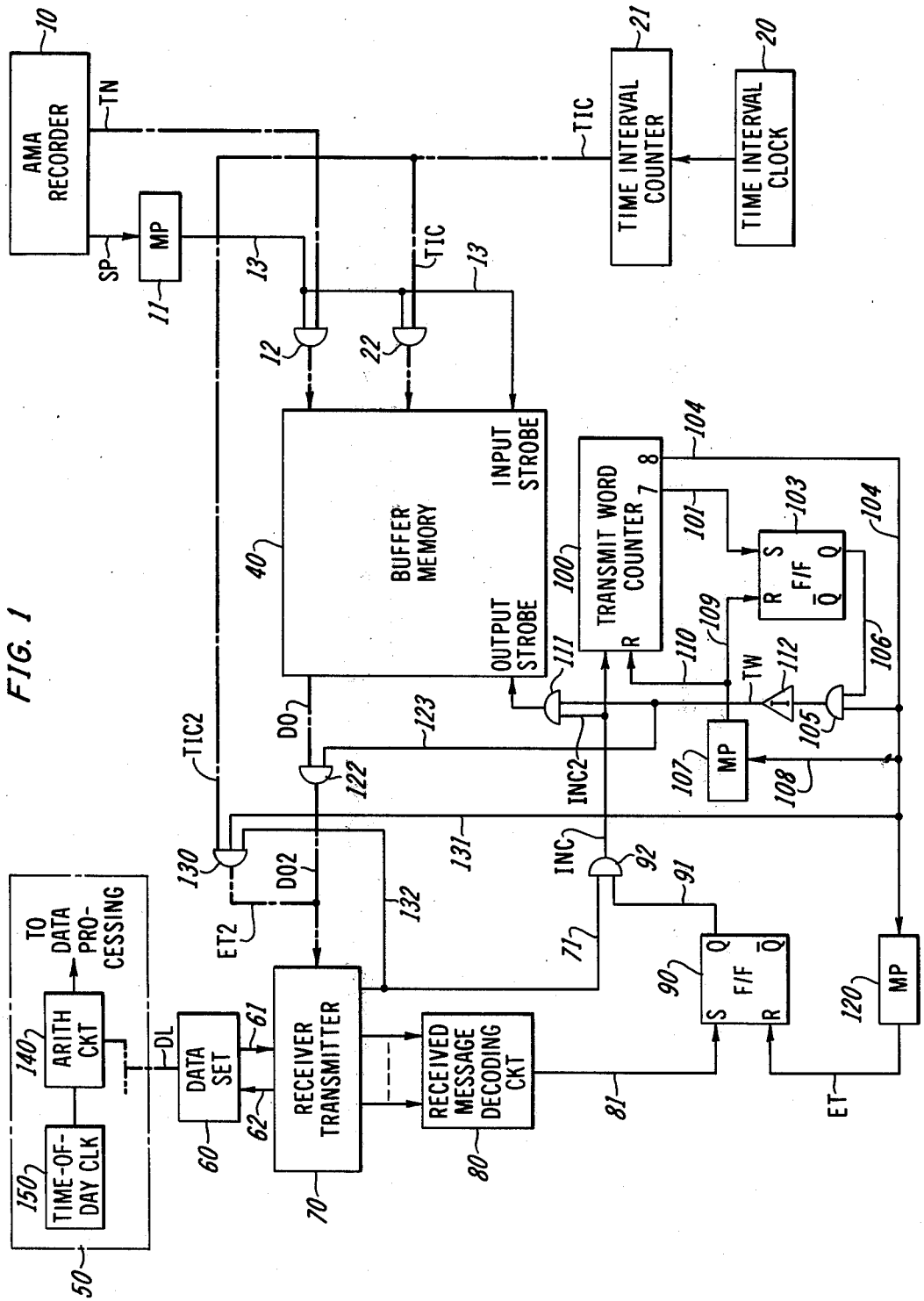
FIG. 1 depicts the organization of one illustrative data billing transmitter incorporating the timing arrangement of this invention, the individual known circuit components being shown in block symbol form.

One illustrative data timing arrangement according to the principles of this invention is shown in FIG. 1 as comprising timing circuitry functioning in cooperation with a telephone system billing data transmitter. The data transmitter is shown in simplified form and in only sufficient detail for a complete understanding of this invention. A billing data transmitter (BDT) of the character contemplated is described in greater detail in the copending application of the present inventor and N. A. Riedel, Ser. No. 643,140, filed Dec. 22, 1975, which will be mentioned hereinafter in connection with an alternate application of the principles of this invention. The function of a BDT, as described in the afore-cited Curtis et al. application, will be considered at this point in general terms to provide background for the timing circuitry of FIG. 1. The BDT operates to receive from an automatic message accounting (AMA) recorder of a telephone centraloffice, such as a No. 5 crossbar office, for example, telephone call data, which data is temporarily stored preparatory to its transmission to a remote automatic message accounting recording center (AMARC). As is known and described in the Curtis et al. application, an AMA recorder typically provides on a plurality of output terminals, a signal present indication, a number of data bit signals representing billing information, and control signals. These recorder output signals in many telelphone systems are employed to control the perforations of paper tape to store the call billing information, which paper tape is then physically transported to a central computation center where the message charges are computed. A BDT thus advantageously avoids the perforation of the paper tape step by transmitting call billing information directly from an AMA recorder to the AMARC.

A BDT arrangement incorporating timing circuitry according to this invention shown in FIG. 1 is adapted to receive output signals from an AMA recorder 10 comprising part of the central office equipment with which the circuitry is intended for use. Recorder 10 may advantageously provide 8 data bits on parallel leads represented by cable TN, which bits represent two binary coded decimal digits indicating a calling trunk circuit number as supplied to the recorder by the call identity indexer of the telephone system. An additional output lead SP of recorder 10 provides a signal present indication. The individual leads of cable TN are connected to corresponding individual input terminals of a plurality of data AND gates represented in the drawing by the single gate 12. The lead SP of recorder 10 is connected via a monopulser circuit 11 and lead 13 to each of second input terminals of the data AND gates as seen in the representative connection to gate 12.

What may be considered the input section of the BDT further comprises a time interval clock 20 of a character well-known in the art, such as a crystal controlled clock, for example, adapted in this embodiment, to generate continuously on its output lead a timing pulse every 0.1 seconds. The output pulses generated by clock 20 are counted by a time interval binary cyclic counter 21, which on 16 parallel output leads, provides 16 count bits representing four binary coded decimal digits. Time interval counter 21 thus produces a count of the timing pulses every 0.1 seconds up to 10,000 seconds, at which point the counting cycle is repeated. The counter 21 output leads are represented by cable TIC, the individual leads of which are connected to corresponding individual input terminals of a plurality of timing AND gates represented in the drawing by the single gate 22. The lead SP of recorder 10 is also connected, via monopulser 11 and lead 13, to each of second input terminals of the timing AND gates as seen in the representative connection to gate 22. The circuits so far mentioned are shown only in block symbol form; since the details of these circuits are universally known and accordingly readily envisioned by one skilled in the art, they need not be further described for a complete understanding of this invention other than to indicate their functions and the character of the signals generated thereby.

The outputs of the data and timing AND gates are applied to the input stage of a buffer memory 40 where the call data and the timing data from time interval counter 21 are stored preparatory to their transmission to the remote AMARC. The memory 40 is also of a character well-known in the art and operates on a first-in, first-out basis with the result that its billing data contents are transmitted to the remote recording center in the order in which it was received from recorder 10. The memory 40 may, for example, comprise a plurality of "fall through" shift registers in which the input data is automatically shifted as new data is received through all of the unused word addresses toward the output state until the last or readout address or other predetermined address is reached. The introduction of data into memory 40 and its progress therethrough is accomplished by write commands via a strobe input also controlled by the output on lead 13 from monopulser 11. At the output stage of memory 40, readout of the stored call and timing data is controlled by transmission requests originating at a remote recording center 50 such as the AMARC previously referred to via a data link DL. Accordingly, the further organization of the exemplary BDT of FIG. 1 is conveniently described proceeding from the terminus of data link DL at the BDT.

Data link DL comprises a transmit and a receive channel orginating and terminating at a data set 60. Data set 60 comprises a modular-demodulator for converting frequency-modulated carrier signals apearing on an incoming receive channel into serial binary digital signals at an output 61 and for converting serial binary digital signals appearing on an input 62 into frequency-modulated carrier signals at an outgoing transmit channel of data link DL. Data set 60 may comprise, for example, circuitry functioning in the manner of the Bell System Series 202 Data Set. The input 62 and output 61 of data set 60 are adapted, respectively, to transmit to the BDT of FIG. 1, serial data representative of a transmission request originating at remote recording center 50 and transmit from the BDT serial call and timing data responsive to that request.

In order to provide serial-to-parallel and parallel-to-serial conversion of binary data, a receiver-transmitter 70 is provided which may comprise, for example, a universal asynchronous receiver-transmitter of the character commercially available under the trademark UART of American Microsystems, Incorporated. Briefly, receiver-transmitter 70 provides receive registers which may be serially loaded with transmission request data from data set 60, which receive registers may be read out in a parallel format to received message decoding circuit 80. Receiver-transmitter 70 also provides transmit registers that may be loaded in a parallel format with call data from memory 40 and serially read out to data set 60. It will be appreciated that receiver-transmitter 70 in practice will include other circuitry such as holding registers, error-checking circuitry, and the like. Since the details of a receiver-transmitter of the character contemplated are well-known, it need be described here only in terms of the functions performed for a complete understanding of this invention.

Data received from remote recording center 50 is decoded to determine its validity as a data transmission request by a decoding circuit 80. These data are taken from the parallel outputs of the receive register of receiver-transmitter 70. If the request is valid, an output is generated on an output lead 81 connected to the set input of a flip-flop circuit 90. The Q output of flip-flop 90 is connected via a lead 91 to one input of an AND gate 92. Receiver-transmitter 70 provides a signal when its transmit register referred to in the foregoing is available to accept parallel input data. This transmit register empty signal is applied via a lead 71 to a second input of AND gate 92. The output of the latter gate is transmitted via a lead INC to the incrementing control of a transmit word counter 100 providing two outputs, one of which, for reasons which will appear hereinafter, indicates a count of 7 and the other a count of 8. The output of gate 92 is also connected via leads INC and INC2 to one input of a memory control AND gate 111. A second input to gate 111 is supplied by output logic coupled to the outputs of transmit word counter 100. The first output for a count of counter 100 is coupled via a cable 101 to the set input of a flip-flop circuit 103. The output for a count of eight is connected via an initial lead 104 to four points in the output section of the BDT. In a first connection, lead 104 is connected to one input of an AND gate 105, the other input of the latter gate being connected to the Q output of flip-flop 103 via a lead 106. Output lead 104 is also connected to the input of a monopulser 107 via a lead 108 and to the input of a second monopulser 120. The output of monopulser 107 is connected to the respective reset terminals of flip-flop 103 and transmit word counter 100 via leads 109 and 110.

The other input to memory control gate 111 is provided via a transmit word lead TW and an inverter gate 112 by the output of AND gate 105. AND gate 111 controls the output strobe control of memory 40, as will be more fully considered hereinafter. The output of monopulser 120 is applied via a lead ET to the reset input of flip-flop 90. The circuits so far described are well-known and their circuit details are readily envisioned by one skilled in the art. For example, word counter 100 may comprise a conventional binary counter, the function and operation of which are universally known. Accordingly, the internal details of these circuits need not be specifically described for a complete understanding of this invention. At the output side of buffer memory 40, a plurality of 24 parallel output leads represented by cable DO are connected to individual first inputs of a plurality of data output AND gates represented by gate 122. The leads of the DO cable are connected to the parallel output leads of the last stage of memory 40 to carry the 24 bits introduced into memory 40 via gates 12 and 22. The output of inverter 112, in addition to controlling the output strobe of memory 40 as an enabling input of gate 111, is also applied via a lead 123 as an enabling input to each of the output gates represented by gate 122.

A plurality of 16 leads represented by a cable TIC2 bridging the buffer memory 40 are connected at the input side of the BDT to the 16 output leads of time interval counter 21 at cable TIC. At the output side of the BDT, the leads of cable TIC2 are connected to individual first inputs of a plurality of end of transmission (ET) AND gates represented by gate 130. The latter gates are also individually connected at second inputs to the last output of transmit word counter 100 via leads 131 and 104. A final input of each of the ET gates represented by gate 130 is provided by the transmit register empty signal carried thereto from lead 71 via lead 132. The 16 outputs of the ET gates represented by gate 130 are connected via a cable ET2 to 16 leads of the 24 leads represented by a cable DO2 carrying timing data from the outputs of the DO gates represented by gate 122. The leads of cable DO2 are connected to the parallel inputs of a receive register which is a component of receiver-transmitter 70 as previously mentioned.

Figure 2:
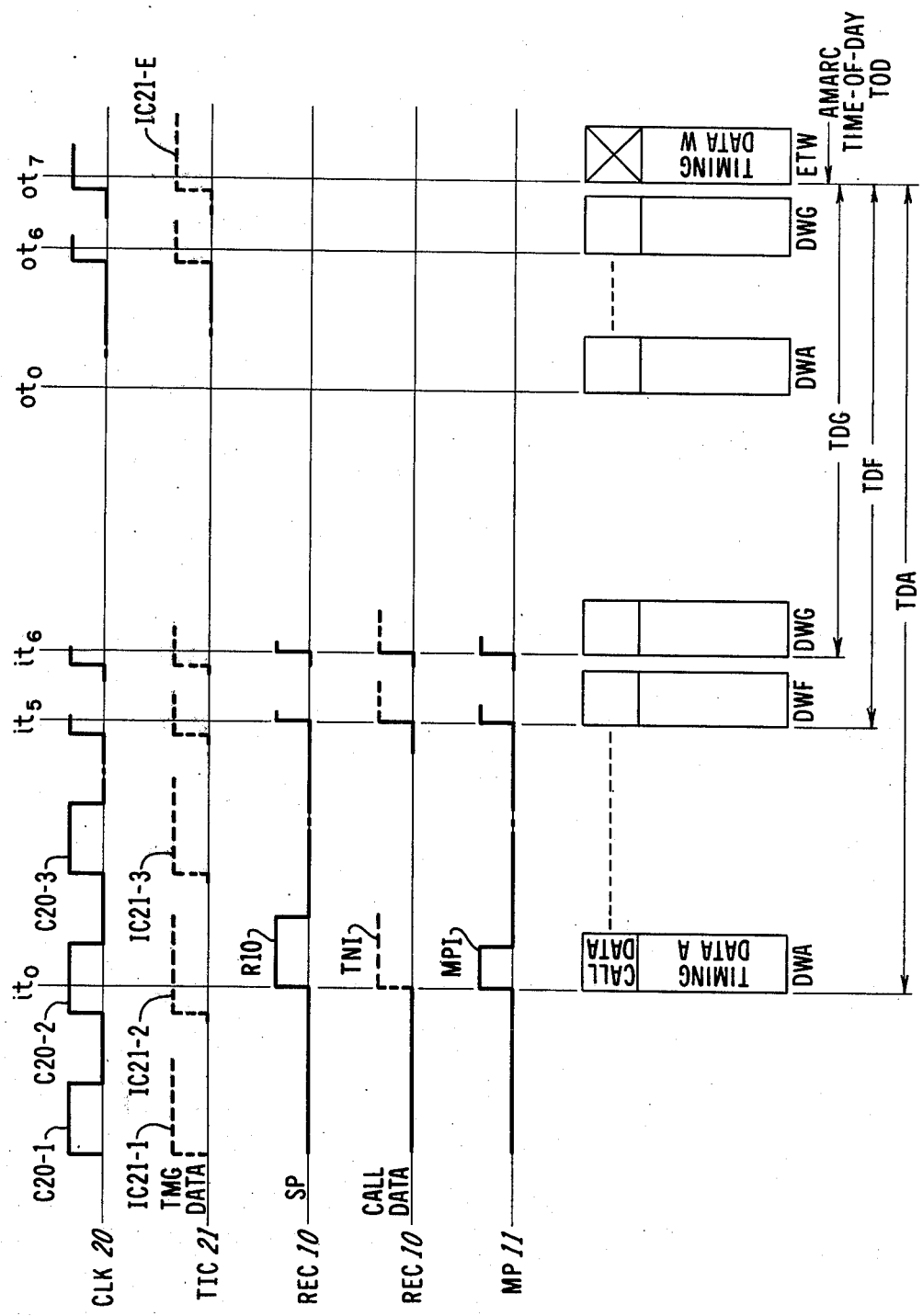
FIG. 2 is a timing chart showing in idealized waveforms, the relative times of occurrences of signals appearing at particular points in the billing data transmitter of FIG. 1 during an illustrative operation.

With the foregoing organization of an illustrative billing data transmitter in mind, an exemplary timing operation according to this invention may now be considered with particular reference being had to the input timing chart of FIG. 2.

As already mentioned, time interval clock 20 generates a continuous series of timing pulses at a frequency of ten per second. These pulses are represented in the chart of FIG. 1 as the positive waveforms C20. The pulses are continuously and serially applied to the input of time interval counter 21 where the pulses are counted for repetitive cycles of 10,000 timing pulses or, in other words, for cycles of 1,000 seconds. The individual counts, which are thus incremented every 0.1 seconds, appear on sixteen output leads of counter 21, making up cable TIC as four binary coded decimal digits applied as 16 timing bits to the inputs of the timing AND gates represented by the gate 22. The waveforms appearing on the 16 leads are represented in FIG. 2 as single positive signals IC21-1, etc., which for purposes of description, will be understood as representing both binary "1's" and binary "0's" on any of the 16 leads. Gates 22 are not enabled and no outputs are generated thereby, however, until the gates 22 are enabled by second inputs. These are provided under the control of AMA recorder 10 when its signal present output lead SP is activated initially, indicating that the identity in two binary coded digits of a trunk circuit on which a call has been answered (or is disconnected) is present on the eight output leads making up cable TN. The signal on the lead SP is typically of 0.1 seconds duration and is represented in FIG. 2 as the positive waveform R10 occurring at an assumed input time $it_0$. As mentioned, the signal R10 indicates the presence on the right leads of cable TN of the binary bits coding the two-decimal-digit identity of the trunk circuit on which a call has been answered or disconnected. These signals are represented in the chart of FIG. 2 by the single waveform TN1 also occurring at the time $it_0$. As is the case with the waveforms IC21-1, etc., the waveforms TN1 are also to be understood as representing both binary "1's" and binary "0's" applied simultaneously to first inputs of the call data AND gates 12.

The signal present output from recorder 10 is initially applied to monopulser 11 which responds, also at time $it_0$, by generating a short pulse of approximately 1-microsecond duration represented in FIG. 2 by the positive waveform MPI. This pulse is applied via a lead 13 as an enabling input to each of the gates 12 and 22. The pulse MPI is additionally applied via a lead 14 to an input strobe terminal of buffer memory 40 where it also functions as a write command. At input time $it_0$, call data represented in FIG. 2 as TN1 indicating the identity number of a trunk having an answered or disconnected call together with timing data represented in FIG. 2 by waveform IC21-2 indicating the count of time interval counter 21 at that particular time are thus entered in a first register address of memory 40 as a first data word DWA. Once entered into buffer memory 40, data word DWA is automatically shifted through each unoccupied word address until the last such address is reached, which will be assumed for purposes of description to be the last stage address of memory 40. The timing data signals IC21-2 are at this time also applied via cable TIC2 to the individual inputs of AND gates 130 at the output side of memory 40. The latter gates are not, however, enabled during an input operation and are operative only during the readout of memory 40 as will appear hereinafter.

As additional answer or disconnect data is made available by AMA recorder 10, the data words made up of this information are introduced into memory 40 in a manner identical to that described for data word DWA indicated in the drawing as entered at input time $it_0$. Each successive data word, it will be understood, includes timing data fixing the particular count of time interval counter 21 as the word is received by the BDT. The requirements of the distant recording center may be such that the message data is transmitted to the latter point in blocks of seven data words. Accordingly, in this case six additional data words have also been introduced into memory 40 and now occupy the 6-word addresses of memory 40 following the address occupied by word DWA. The last two data words DWF and DWG are represented in FIG. 2 as having entered memory 40 at input times $it_5$ and $it_6$, respectively. Subsequent blocks of message data words will follow the block already considered. A description of the readout of only the latter, however, will suffice for a complete understanding of an illustrative timing arrangement according to this invention.

Initiation of the interrogation of the BDT originates at the remote automatic message accounting recording center (AMARC) 50 where coded frequency modulated signals are serially transmitted to the BDT via data link DL. The signals are converted by data set 60, as previously mentioned, into serial binary signals which appear on its output 61. The binary signals are received in a receive register of receiver-transmitter 70 in which R-T serial-to-parallel conversion is accomplished. To determine whether the signals incoming from the AMARC indicate a valid request for transmission, the request signals are decoded by decoding circuit 80 which circuit 80 generates and applies a request signal to output conductor 81 if the request is valid. This signal and other signals to be referred to which act as enabling potentials for the various gates or which represent binary "1's" are conventionally positive high potentials while other signals are low potentials. The request signal is applied via conductor 81 to set flip-flop 90 which had previously been in the reset state. The Q output of flip-flop 90, as a result, is energized to apply a high potential to one input of AND gate 92. At this time, the input transmit register of receiver-transmitter 70 may be unoccupied, in which case a register empty potential is transmitted via conductor 71 to the other input of gate 92. As a result, the latter gate generates a high output potential which serves to accomplish two functions.

The output of gate 92 is applied via lead INC to increment transmit word counter 100 which advanced to a count of 1. The output of gate 92 is also applied via leads INC and INC2 to one input of memory control gate 111. Because counter 100 has not advanced to a count of 7, flip-flop 103 remains in its reset state. The Q output of the latter circuit similarly remains inactive thereby maintaining, via lead 106, the output of gate 105 in its low potential state. This low potential is inverted by inverter gate 112 which thus applies an enabling high potential to the other input of memory control gate 111 via lead TW. As a result, gate 111 generates an output signal in response to the enabling of gate 92 which is applied to the output strobe terminal of memory 40 where it acts as a readout command to read out data word DWA occupying the last address of the memory. The high output potential of inverter 112 is simultaneously applied via conductor 123 to first inputs of the memory output AND gates represented in the drawing by gate 122. The 24 bits making up data word DWA are thus transferred from memory 40 to the transmit register of receiver-transmitter 70 via the individual leads of cables DO and DO2, indicated in the chart of FIG. 2 as occurring at the output time $ot_0$. As the first data word DWA occupies the transmit register of receiver-transmitter 70, the transmit register empty signal on lead 71 is interrupted, and, as a result, gate 92 is now inhibited. It may be noted in passing that the transmit register empty signal was originally also applied via lead 132 to one input of each of the ET gates represented by gate 130. Since the other inputs of these gates are not energized at this time, they remain inactive until a final step in the readout operation to be considered hereinafter. Receiver-transmitter 70 converts data word DWA from a parallel format into a serial format after which it is transmitted via output 62 to data set 60. After a final conversion at the latter circuit from serial binary digital signals into frequency-modulated carrier signals, the call answer data word DWA is transmitted to the distant AMARC 50 via data link DL. At the latter point data word DWA is stored until receipt of the final data word of the block being transmitted at which time the timing computation in accordance with this invention is accomplished in a manner to be described.

The remaining data words of the 7-word block being transmitted are read out of memory 40 in a manner identical to that described for data word DWA, the last data word DWG being shown in FIG. 2 as being read out at output time $ot_6$, each of the words containing its individual time interval count data. As transmit word counter 100 is successively incremented under the control of the transmit register empty signal and the output of gate 92, the readout of the seventh data word DWG is marked by the activation of the count of 7 output of counter 100. This applies a set potential to flip-flop 103 which, as a result, energizes its Q output to apply a first input potential to gate 105 via lead 106. When a transmit register empty signal is again received at gate 92, transmit word counter 100 is incremented to energize the count of 8 output connected to lead 104. The potential appearing on the latter lead accomplishes, as a first of its functions, the enabling of gate 105 which now applies a high output potential to inverter gate 112. The inverted output of the latter circuit inhibits gates 111 and 122 via leads TW and 123, respectively. As a result, no data word is read at this time from memory 40.

ET and gates 130 are, however, enabled at this time, indicated in FIG. 2 as output time $ot_7$, by the transmit register empty signal on lead 132, the potential from transmit word counter 100 applied via leads 104 and 131, and, importantly, the 16 binary coded digit signals carried thereto via the individual leads of cable TIC2. The latter signals represent the time interval count generated by cyclic time interval counter 21 at the end-of-transmission (ET) time $ot_7$. These ET data are carried via cable ET2 to connect with the 16 timing data leads of cable DO2 and thereby to the transmit register of receiver-transmitter 70. An end-of-transmission data word ETW is thus made up and is incorpoated as the last word of the data block being transmitted, the word ETW containing as significant information content the timing data from time interval counter 21 at time $ot_7$. As the word ETW is transmitted to AMARC 50 in the manner previously described, the transmit register of receiver-transmitter 70 is again restored to its unoccupied state and the register empty signal is interrupted. As a result, gates 92 and 130 are inactivated and it remains only to reset the various circuits in preparation for a subsequent polling of the BDT. This is also accomplished by the potential presently appearing on the count of eight output of transmit word counter 100 and lead 104. The latter potential triggers monopulser 120 and, via lead 108, monopulser 107. The output of monopulser 120 is applied via lead ET to reset flip-flop 90. The output of monopulser 107 is applied via lead 109 to reset flip-flop 103 and via lead 110 to reset and thereby clear transmit word counter 100. The BDT of FIG. 1 is now prepared for a subsequent request from AMARC 50 for the transmission of other blocks of message data which may have been received from AMA recorder 10.

From the foregoing description of an exemplary cycle of operation of a BDT incorporating the timing arrangement of this invention, it is apparent that each of the data words DWA, . . . DWG was delayed in buffer memory 40 by a varying time interval represented in FIG. 2 as time intervals TDA, . . . TDG. TDA thus represents the time interval from the time which a call message event recorded as data word DWA was first detected by the BDT to the time the data word DWA regarding the message event was transmitted to the AMARC. Similarly, time interval TDG represents the time from which the call event word DWG was detected by the BDT to the time data word DWG was transmitted to the AMARC. Thus, the successive data words of a block readout of memory 40 will be represented at AMARC 50 as having been delayed by diminishing and varying time intervals TDA, . . . TDG indicated in FIG. 2.

The actual time of day that an event occurred at the BDT, e.g., a call answer or disconnect signal is received, is the time of day at the AMARC 50 when data word ETW is received, less the delay in transmitting information regarding its occurrence to the AMARC. Taking the detection of data word DWA at the BDT, for example, as occurring at input time $it_0$, the time interval count at that time is represented in FIG. 2 by waveform IC21-2 as timing data A. Data word DWA is transmitted to AMARC 50 as part of a block ending with data word ETW at time $ot_7$. The time interval count at that time being represented in FIG. 2 by waveform IC21-E as timing data W. Time interval TDA is thus the elapsed time from $it_0$, identified as timing data A when the event occurred, until $ot_7$, identified as timing data W when the end of block was transmitted. The actual time-of-day TOD at the AMARC 50 when data word ETW is received may be represented as timing data OD. Therefore, the actual time of the event $T_a$ is the time-of-day TOD minus delay time interval TDA and is computed as $$T_a = OD - (W-A). \tag{1}$$

Time interval count $W$, in marking a time later than that of count $A$, will be greater than count $A$, and $(W-A)$ will always be a positive number with one possible exception. During the delay of a data word in buffer memory 40, time interval counter 21 may complete a 10,000 interval count cycle and begin another. In this case, 10,000 is added to the term $(W-A)$. Thus, more precisely, $$T_a = OD - (W-A) + Y. \tag{2}$$

where $Y = 10,000$ if $A > W$. Where normally $W > A$, $Y = 0$. It will also be appreciated that each data word transmitted, and in particular data word ETW, is subject to a delay equal to the time required for its transmission from the BDT to the distant AMARC 50. This small transmission delay may be readily predetermined for each remote BDT and may be included as a refinement in the above computation. Since each data word ETW from a given BDT is delayed the same length of time, answer and disconnect entries are equally effected and calculated. All duration times are error free without the suggested refined calculation.

The above timing computation is readily performed at AMARC 50 by known arithmetic circuitry 140 to which the timing data of the data words is applied. A master time-of-day clock 150 of a 0.1 second precision provides actual time data group OD to arithmetic circuitry 140. The actual time $T_a$ of the occurrence of the event at the BDT, that is, the call answer input to the BDT of exemplary data word DWA, is finally available at the output of arithmetic circuitry 140 for further processing to determine message charges. A companion data word marking the disconnect of the call under consideration will subsequently be received by the BDT which will be processed for its delay in memory 40 in a manner identical to that described for call answer data word DWA. The messages charges for the time of the call are thus obtainable in 0.1-second increments in accordance with the principles of this invention.

In the foregoing, an illustrative apparatus embodiment of the invention for performing its novel timing method was described. In an alternative arrangement the operation of this invention may be performed in a special purpose processor in which the sequence of logical operations is controlled by the output signals from a read-only memory. For example, in the aforecited Curtis et al. application, the common random access memory of the apparatus disclosed in the copending application of S. D. Coomer, Ser. No. 626,338, filed Oct. 28, 1975, is employed for the buffer memory, the interval timer memory, and the memory of the transmit counter and such equipment may be employed in the alternative arrangement. Accordingly, on each occurrence of a signal from a 0.1-second interval timer, the special purpose processor may be sequenced to increment the interval count by 1. On each occurrence of an event in the recorder the special purpose processor may be sequenced to store the event number and the interval count in the area of the random access memory assigned for the buffer memory function. Likewise, responding to a transmit request, transferring data words from the area of random access memory assigned for the buffer memory function to the data set, and performing the special logic related to end-of-transmission may be performed by logic sequences provided for the special purpose processor.

Accordingly, what has been described is considered to be only one illustrative timing arrangement according to this invention and it is to be understood that various and numerous other arrangements may be devised by one skilled in the art without departing from the spirit and scope of this invention as defined by the accompanying claims.

What is claimed is:

1. In combination in a telephone call billing system, storage means for temporarily storing call data and timing means for determining the delay time of said call data in said storage means comprising means for generating a continuous series of periodic signals, means for counting said signals and for generating successive time interval data representative of particular signal counts, means responsive to the introduction of said call data in said storage means for combining said call data and first particular time interval data to form a first data word in said storage means, means responsive to the subsequent readout from said storage means of said first data word for generating a second data word including second particular time interval data, and means for comparing said first and second particular time interval data of said first and second data words, respectively, for generating delay signals indicative of said delay time.

2. The combination as claimed in claim 1, said timing means also comprising means for determining the actual occurrence time of said introduction of said call data in said storage means comprising means for generating actual time-of-day signals and means for comparing said delay signals and said actual time-of-day signals for generating signals indicative of said actual occurrence time.

3. In combination in a telephone call billing system, storage means for temporarily storing call data, and timing means for determining the delay time of said call data in said storage means comprising means for generating a continuous series of periodic signals, means for cyclically counting said signals and for generating successive time interval data representative of particular signal counts, means for indicating the time of the introduction of call data in said storage means within a counting cycle comprising means for combining said call data and first particular means for combining said call data and first particular time interval data to form a first data word in said storage means, and means for indicating the time of the readout of said first data word from said storage means within a counting cycle comprising means responsive to said readout for generating a second data word including second particular time interval data.

4. In combination in a telephone call billing system wherein call data is temporarily stored in a storage means, timing means for determining the delay time of said call data in said storage means comprising means for continuously generating timing data representative of successive time intervals with successive timing cycles, means responsive to the entry of call data in said storage means for indicating the time of said entry within a timing cycle comprising means for combining said call data and first timing data to form a first data word in said storage means, and means responsive to the readout of said first data word from said storage means for indicating the time of said readout within a timing cycle comprising means for generating a second data word including subsequent timing data.

5. In the combination as claimed in claim 4, said timing means also comprising arithmetic means for comparing said first and said subsequent timing data of said first and second data words, respectively, and for generating first time signals indicative of said delay time.

6. In the combination as claimed in claim 5, said timing means also comprising clock means for generating second time signals indicative of the actual time of day for comparison with said first time signals to determine the actual time of day of the occurrence of said entry of said call data in said storage means.

7. In combination in a telephone call billing system wherein call data are temporarily stored in a storage means, timing means for marking the delay times of call data in said storage means comprising means for generating a continuous series of periodic signals, means for cyclically counting said signals and for generating successive time interval data representative of particular signal counts, means responsive to the entries of call data in said storage means for indicating the times of said entries within a counting cycle comprising means for combining each call data entry and particular successive time interval data to form a plurality of first data words in said storage means, and means responsive to the readout of the last of said plurality of first data words from said storage means for indicating the time of said readout within a counting cycle comprising means responsive to said readout for generating a second data word including final time interval data.

8. In a telephone call billing system having a buffer memory for temporarily storing call data prior to transmission to a recording center, in combination, means for generating periodic signals, means for counting said signals in recurring cycles and for generating timing data representative of the occurrence time of said periodic signals within a counting cycle, means responsive to the entry of said call data in said memory for combining said call data and particular first timing data to form a first data word in said memory, means responsive to subsequent interrogate signals from said recording center for causing the readout of said first data word from said memory, and means responsive to said readout of said first data word for generating a second data word including subsequent particular second timing data.

9. In a telephone call billing system, the combination as claimed in claim 8 also comprising means for transmitting said first and said second data words to said recording center and means at said recording center for comparing said first and second timing data of said first and second data words, respectively, for generating delay signals indicative of the delay of said call data in said buffer memory.

10. In a telephone call billing system, the combination as claimed in claim 9 also comprising means at said recording center for determining the actual occurrence time of said entry of said call data in said memory comprising means for generating actual time-of-day signals and means for comparing said delay signals and said time-of-day signals for generating signals indicative of said actual occurrence time.

11. A timing system for determining at a first location the time of occurrence of an event at a second location where event data identifying said event is temporarily stored in a memory at said second location, comprising at said second location means for generating periodic signals, means for counting said periodic signals in recurring cycles and for generating timing data representative of the occurrence time of said periodic signals within a counting cycle, means responsive to the occurrence of said event for combining said event data and particular first timing data to form a first data word in said memory, means responsive to the readout of said first data word from said memory for generating a second data word including subsequent second timing data, and means for transmitting signals representing said first and second data words to said first location, said system further comprising at said first location means for comparing said first and second timing data of said first and second data words, respectively, for generating delay signals indicative of the temporary storage time of said event data in said memory.

12. A timing system as claimed in claim 11 also comprising at said first location means for generating actual time-of-day signals and means for comparing said time-of-day signals and said delay signals for generating signals indicative of the actual time-of-day occurrence of said event at said second location.

* * * * *

UNITED STATES PATENT AND TRADEMARK OFFICE
CERTIFICATE OF CORRECTION

PATENT NO. : 4,058,680

DATED : November 15, 1977

INVENTOR(S) : Robert Bartlett Curtis

It is certified that error appears in the above-identified patent and that said Letters Patent are hereby corrected as shown below:

Column 1, line 61, "togetherwith" should read --together with --. Column 2, line 53, "(AMAR)" should read --(AMARC)--; line 55, "associted" should read --associated--. Column 4, line 13, "telelphone" should read --telephone--; line 41, "well-known" should read --well known--; line 44, "seconds" should read --second--; line 49, "seconds" should read --second--. Column 5, line 3, "well-known" should read --well known--; line 11, "state" should read --stage--; line 24, "orginating" should read --originating--; line 56, "well-known" should read --well known--. Column 6, line 32, "well-known" should read --well known--; line 39, "24" should read --twenty-four--; line 44, "24" should read --twenty-four--; line 52, "16" should read --sixteen--; line 63, "16" should read --sixteen--; line 64, "24" should read --twenty-four--. Column 7, line 14, "seconds" should read --second--; line 17, "16" should read --sixteen--; line 19, "16" should read --sixteen--; line 22, "1's" should read --1s--; same line, "0's" should read --0s--; same line, "16" should read --sixteen--; line 31, "seconds" should read --second--; line 34, "right" should read --eight--; line 42, "1's" should read --1s--; line 43, "0's" should read --0s--.

UNITED STATES PATENT AND TRADEMARK OFFICE
CERTIFICATE OF CORRECTION

PATENT NO. : 4,058,680

DATED : November 15, 1977

INVENTOR(S) : Robert Bartlett Curtis

It is certified that error appears in the above-identified patent and that said Letters Patent are hereby corrected as shown below:

Column 8, line 41, "1's" should read --"1s"--. Column 9, line 3, "24" should read --twenty-four--; line 54, "16" should read --sixteen--; line 59, "16" should read --sixteen--. Column 11, line 27, "messages" should read --message--. Column 12, lines 33-34, delete "and first particular means for combining said call data".

Signed and Sealed this

Seventeenth Day of June 1980

[SEAL]

Attest:

SIDNEY A. DIAMOND

Attesting Officer

Commissioner of Patents and Trademarks